(12) United States Patent
Chang

(10) Patent No.: US 7,092,263 B2
(45) Date of Patent: Aug. 15, 2006

(54) DC-DC CONVERTER FOR CONVERTING AN INPUT VOLTAGE TO A FIRST OUTPUT VOLTAGE

(75) Inventor: I-Ting Chang, Taipei (TW)

(73) Assignee: Au Optronics Corp., Hsinchu (TW)

( * ) Notice: Subject to any disclaimer, the term of this patent is extended or adjusted under 35 U.S.C. 154(b) by 0 days.

(21) Appl. No.: 11/008,742

(22) Filed: Dec. 9, 2004

(65) Prior Publication Data

US 2005/0219877 A1    Oct. 6, 2005

(30) Foreign Application Priority Data

Apr. 2, 2004    (TW)    ............................. 93109232 A

(51) Int. Cl.
*H02M 7/02*    (2006.01)
*H02M 7/19*    (2006.01)

(52) U.S. Cl. ........................... 363/59; 363/60; 307/110

(58) Field of Classification Search ................. 363/59, 363/60; 307/108, 110
See application file for complete search history.

(56) References Cited

U.S. PATENT DOCUMENTS

| | | | |
|---|---|---|---|
| 4,777,577 A | 10/1988 | Bingham et al. ............ 363/60 |
| 4,802,739 A | 2/1989 | Iwamoto ..................... 350/332 |
| 4,807,104 A | 2/1989 | Floyd et al. ................. 363/59 |
| 5,051,881 A | 9/1991 | Herold ......................... 363/60 |
| 5,111,375 A | 5/1992 | Marshall ...................... 363/60 |
| 5,132,895 A | 7/1992 | Kase ............................ 363/60 |
| 5,245,524 A | 9/1993 | Nakagawa et al. ........... 363/62 |
| 5,306,954 A | 4/1994 | Chan et al. .................. 307/110 |
| 5,410,465 A | 4/1995 | Tan .............................. 363/60 |
| 5,438,504 A * | 8/1995 | Menegoli ...................... 363/60 |
| 5,566,059 A | 10/1996 | Tan .............................. 363/60 |
| 5,625,544 A | 4/1997 | Kowshik et al. ............. 363/59 |
| 5,635,776 A * | 6/1997 | Imi ............................ 307/110 |
| 5,768,116 A | 6/1998 | Kompelien .................. 363/59 |
| 5,808,883 A | 9/1998 | Hawkes ....................... 363/60 |
| 5,939,866 A | 8/1999 | Björkengren ............... 323/266 |
| 6,028,419 A | 2/2000 | Mack .......................... 323/272 |
| 6,031,742 A * | 2/2000 | Journeau ..................... 363/60 |
| 6,091,291 A * | 7/2000 | Fournel ...................... 327/589 |
| 6,359,797 B1 * | 3/2002 | Bayer et al. .................. 363/60 |
| 6,509,894 B1 | 1/2003 | Maekawa et al. ........... 345/211 |
| 6,538,907 B1 * | 3/2003 | Hoshino et al. .............. 363/60 |
| 6,710,773 B1 * | 3/2004 | Jenkins et al. .............. 345/211 |
| 6,720,822 B1 * | 4/2004 | Torrisi et al. ............... 327/536 |

* cited by examiner

*Primary Examiner*—Bao Q. Vu
(74) *Attorney, Agent, or Firm*—Thomas, Kayden, Horstemeyer & Risley

(57) ABSTRACT

A DC—DC converter is provided for converting an input voltage to a first output voltage. The input voltage is input to a first selecting switch, controlled by a first signal, and a second selecting switch. A first capacitor has one end, input by the first signal, and the other end, electrically coupled to the first selecting switch and outputs a first control voltage to control the second selecting switch. A second capacitor has one end, input by a second signal, and the other end, electrically coupled to the second selecting switch and outputs a first storage voltage. The first select switch outputs the first storage voltage as the first output voltage according to the first control voltage. The first or the second signal comes to a first and a second voltage levels by turns and they come to the first or the second level at a different time point.

22 Claims, 10 Drawing Sheets

US 7,092,263 B2

DC-DC CONVERTER FOR CONVERTING AN INPUT VOLTAGE TO A FIRST OUTPUT VOLTAGE

This application claims the benefit of Taiwan Application Patent Serial No. 093109232, filed Apr. 2, 2004, the subject matter of which is incorporated herein by reference.

BACKGROUND OF THE INVENTION

1. Field of the Invention

The invention relates in general to DC—DC converters, and more particularly to DC—DC converters that are capable of outputting three times amplified, and two times amplified and inverted voltages.

2. Description of the Related Art

DC—DC converter is a circuit device that receives an input DC voltage and produces a DC output voltage. DC—DC converters have been used to amplify DC voltages, or to invert input DC voltages and output them as negative voltages. Due to their ability to receive low input voltages and consume low power, DC—DC converters have been widely used in all types of electronic products.

Low temperature poly-Si LCDs (liquid crystal display) are equipped with the technology to integrate circuits onto the glass substrate. Thus, integrating the DC—DC converter onto the LCD panel can result in many advantages including the reduction of the surrounding area, the ability to have low voltage supply and a single DC voltage source input, the reduction in production costs, and the ability to apply in mobile electronic products.

FIG. 1A is a circuit diagram of the traditional DC—DC converter. DC—DC converter 100, applying the theory of charge pump, uses clock signals $\overline{\phi 1}$, $\phi 2$, $\phi 1$ and $\phi 2$ to control transistors SW1, SW2, SW3 and SW4, and converts input voltage VDD to output voltage Vo1 of 2VDD. Then DC—DC converter uses clock signals $\phi 2$, $\overline{\phi 2}$, $\overline{\phi 2}$ and $\overline{\phi 2}$ to control transistors SW5, SW6, SW7 and SW8, and converts the value of output voltage Vo1 to an output voltage Vo2 of 3VDD, and also uses clock signals $\phi 2$, $\phi 2$, $\overline{\phi 1}$, and $\phi 1$ to control transistors SW9, SW10, SW11 and SW12, and converts output voltage Vo1 to output voltage Vo3 of −2VDD.

As shown in FIG. 1B, at time T1, the voltage level of clock signal $\phi 1$ is at VDD, the voltage level of clock signal $\phi 2$ is at 3VDD, and the voltage level of clock signal $\overline{\phi 1}$ is at −2VDD. At this time, transistor SW1 and SW4 turn on, but transistor SW2 and SW3 remain off, making the voltage across capacitor C1 to equal VDD. At time T2, clock signal $\phi 1$ is at −2VDD, clock signal $\phi 2$ is at 0V, clock signal $\overline{\phi 1}$ is at VDD, and clock signal $\overline{\phi 2}$ is at 3VDD. At this time, transistors SW1 and SW4 are turned off, and transistor SW2 and SW3 are turned on, causing output voltage Vo1 to become 2VDD. In addition, at time T2, transistors SW5 and SW7 are turned on, and SW6 and SW8 are turned off, causing the voltage across C2 to be VDD. And transistors SW10 and SW11 are turned on, and transistors SW9 and SW12 remain off, causing the voltage across C3 to be 2VDD.

At time T3, clock signal $\phi 1$ is at signal level VDD, clock signal $\phi 2$ is at 3VDD, clock signal $\overline{\phi 1}$ is at −2VDD, and clock signal $\overline{\phi 2}$ is at 0V. At this time, transistors SW5 and SW7 are turned off, and transistors SW6 and SW8 are turned on, causing output voltage Vo2 to become 3VDD. And transistors SW10 and SW11 are turned off, and transistors SW9 and SW12 are turned on, causing output voltage Vo3 become −2VDD.

However, the described DC—DC converter 100 must use additional shift register 110 and 120 to convert clock signal CLK individually into the described clock signals $\phi 1$, $\overline{\phi 1}$, $\phi 2$ and $\overline{\phi 2}$, as shown on FIG. 1C. Only then the DC—DC converter 100 can output the expected two times amplified, three times amplified, and two times amplified and inverted output voltages. However, the positive bias VDD and negative bias −2VDD of level shifter 110, and the positive bias 3VDD of level shifter 120 are provided by the DC—DC converter 100, thus, this structure will not only increase the loading of DC—DC converter 100, but also aggravate the time required for DC—DC converter 100 to output stabilized voltage.

FIG. 2 is a circuit diagram of the DC—DC converter disclosed by U.S. Pat. No. 6,509,894. DC—DC converter 210 or 220 uses the clock signal HCK of the shift register (not shown on the figure) on the panel of low temperature poly-Si LCD as the clock signal, and uses inverter 211 and 212 or inverter 221 and 222 to output clock signals $\phi 11$ and $\phi 12$ or clock signals $\phi 21$ and $\phi 22$. The clock signals are used to charge and discharge the capacitors C11 and C12 or C21 and C22 to control transistors T11, T12 and T13 or transistors T21, T22, and T23, and cause DC—DC converter 210 or 220 to be able to amplify the DC input voltage to produce twice amplified and inverted output voltages.

However, the high voltage levels of clock signal HCK of the shift register (not shown on the figure), located on the panel of the low temperature poly-Si LCD, are mostly at 3.3V. In order to produce a positive output voltage 2VDD of 9~10V, and a negative output voltage −VDD of −6.5V~−5V, the DC input voltage VDD and the positive bias voltage VDD of inverter 211, 212, 221 and 222 must be equal to 5V. Thus, the DC—DC converter of the LCD as disclosed by U.S. Pat. No. 6,509,894 must use an additional 5V DC voltage source and thereby increases the production cost of the system and the power consumption.

SUMMARY OF THE INVENTION

It is therefore an object of the invention to provide a DC—DC converter that utilizes existing DC voltage source, and clock signals from the shift register, both located on the LCD panel, to output three times amplified, and two times amplified and inverted output voltages, without the need of any additional clock signals, or any additional DC voltage source signals. The present invention has the advantages of being able to quickly provide three times amplified, and two times amplified and inverted output voltages, and reduces production costs and power consumption.

The invention achieves the above-identified object by providing a DC—DC converter to convert an input voltage to a first output voltage, and the DC—DC converter includes a first voltage output unit, a first energy-storing unit, and a first selecting switch. First voltage output unit includes a first selecting switch, and a first capacitor. First selecting switch includes a first input terminal and a first output terminal. Input voltage is input to first input terminal, and first selecting switch is controlled by a first signal. First capacitor has an a1 end and a b1 end, where b1 end is coupled to first output terminal of first selecting switch, and outputs a first control voltage, and a1 end receives first signal. First energy-storing unit includes a second selecting switch, and a second capacitor. Second selecting switch includes a second input terminal and a second output terminal, where input voltage is input to second input terminal, and second selecting switch is controlled by first control voltage. Second capacitor has an a2 end and a b2 end, where b2 end is coupled to second output terminal of second selecting switch, and outputs a first energy-storing voltage, and a2 end receive a second signal. First selecting switch receives first energy-storing voltage, and uses signal level of first control voltage as a reference to alternatively output a first energy-storing voltage as first output voltage, wherein first signal is alternatively at a first and a second signal level, and second signal is alternatively at a second and a first signal level. First and second signal come to a second signal level at a different time point. The value of first control voltage and first energy-storing voltage change according to first and second signal.

Other objects, features, and advantages of the invention will become apparent from the following detailed description of the preferred but non-limiting embodiments. The following description is made with reference to the accompanying drawings.

DETAILED DESCRIPTION OF THE INVENTION

The invention utilizes existing DC voltage source, and clock signals from the shift register, both located on the LCD panel, to output three times amplified, and two times amplified and inverted output voltages, and to accomplish the goals in achieving low voltage input, reducing panel area, and decreasing power consumption without the need of any additional level shifters to increase signal levels of clock signals, or any additional DC voltage source signals. The following illustration includes two separate embodiments to demonstrate how DC—DC converter under this invention outputs three times amplified, and two times amplified and inverted output voltages. In the following two embodiments, clock signal CLK is high when signal level is at VDD, and CLK is low when signal level is at 0V.

FIRST EMBODIMENT

Figure 1A:
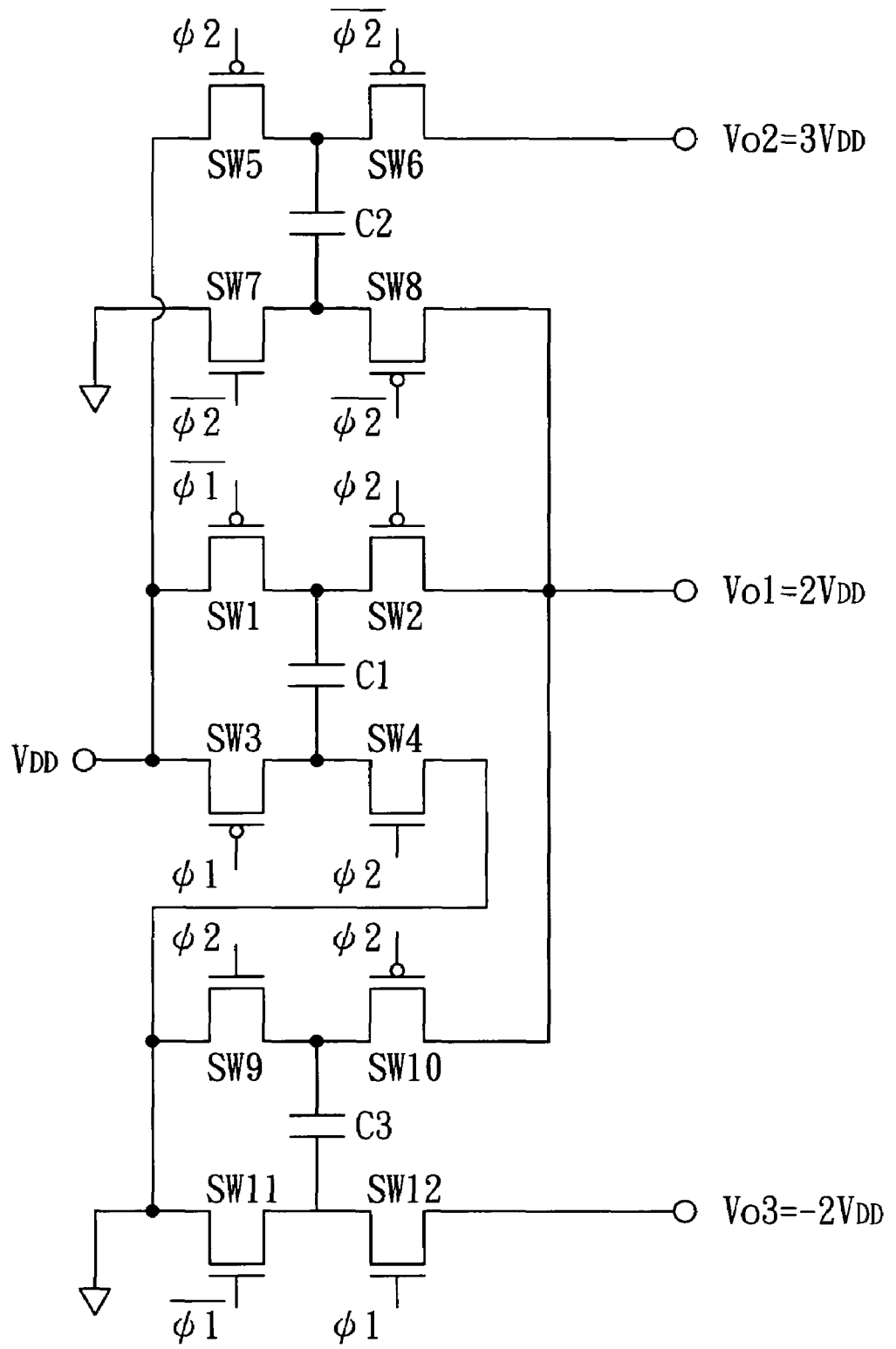
FIG. 1A (Prior Art) is circuit diagram showing a conventional DC—DC converter.
Figure 1B:
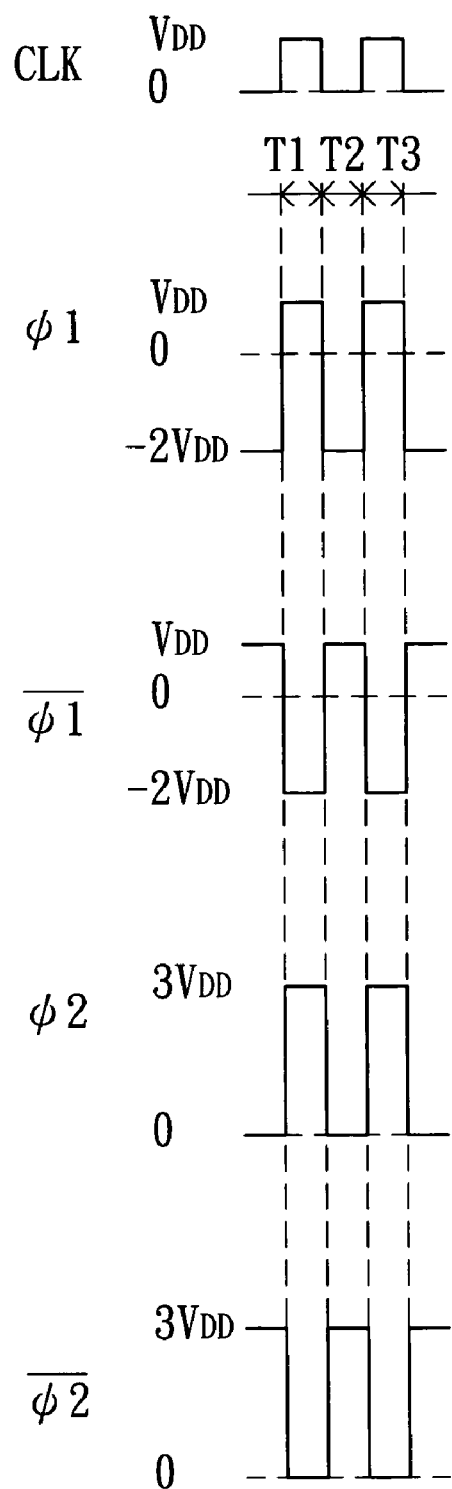
FIG. 1B (Prior Art) is signal timing diagram showing clock signals CLK, φ1, φ2 $\overline{\phi1}$, and, $\overline{\phi2}$ of DC—DC converter in FIG. 1A.
Figure 1C:
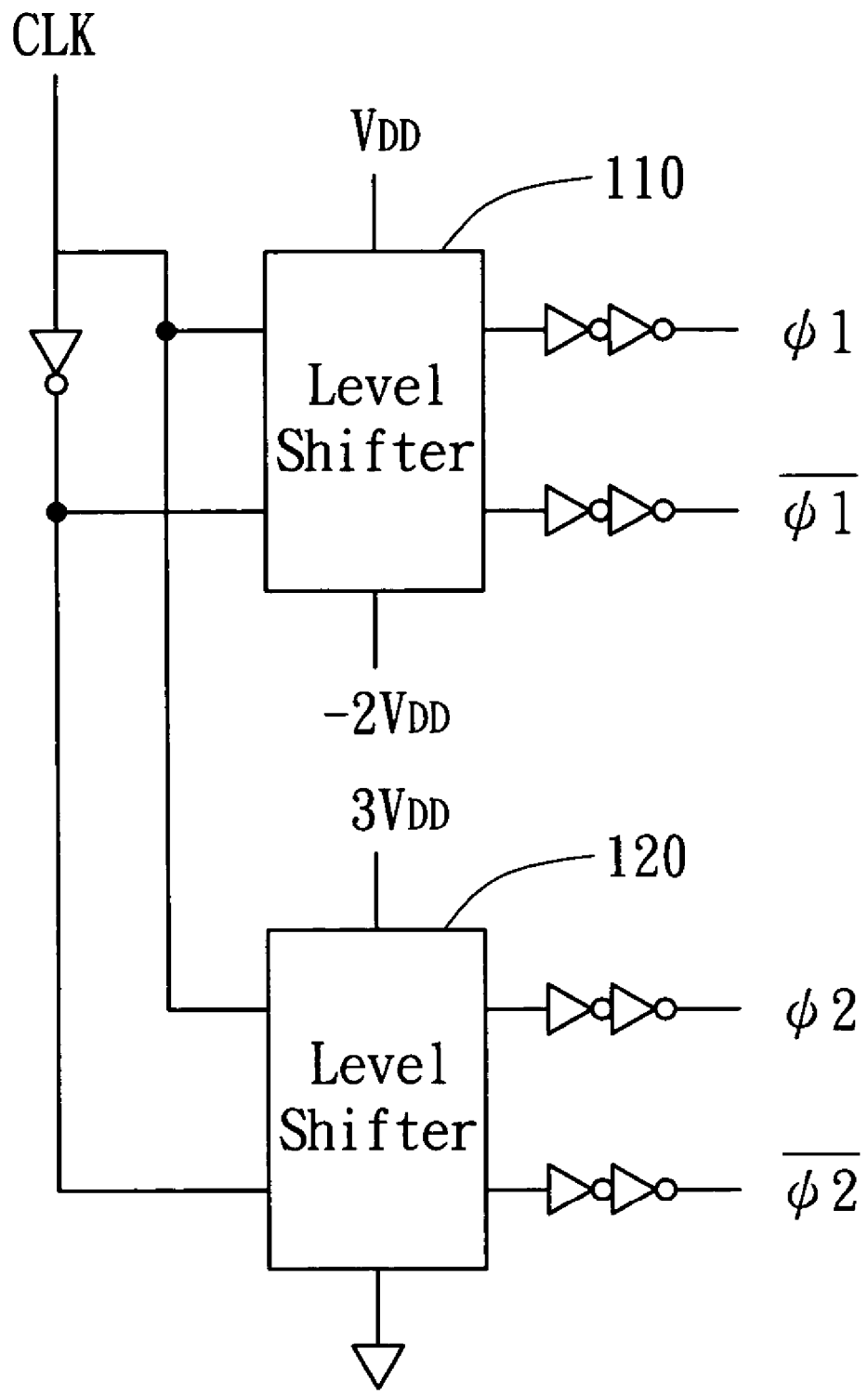
FIG. 1C (Prior Art) is partial block diagram of level shifters which are used by the DC—DC converter in FIG. 1A.
Figure 2:
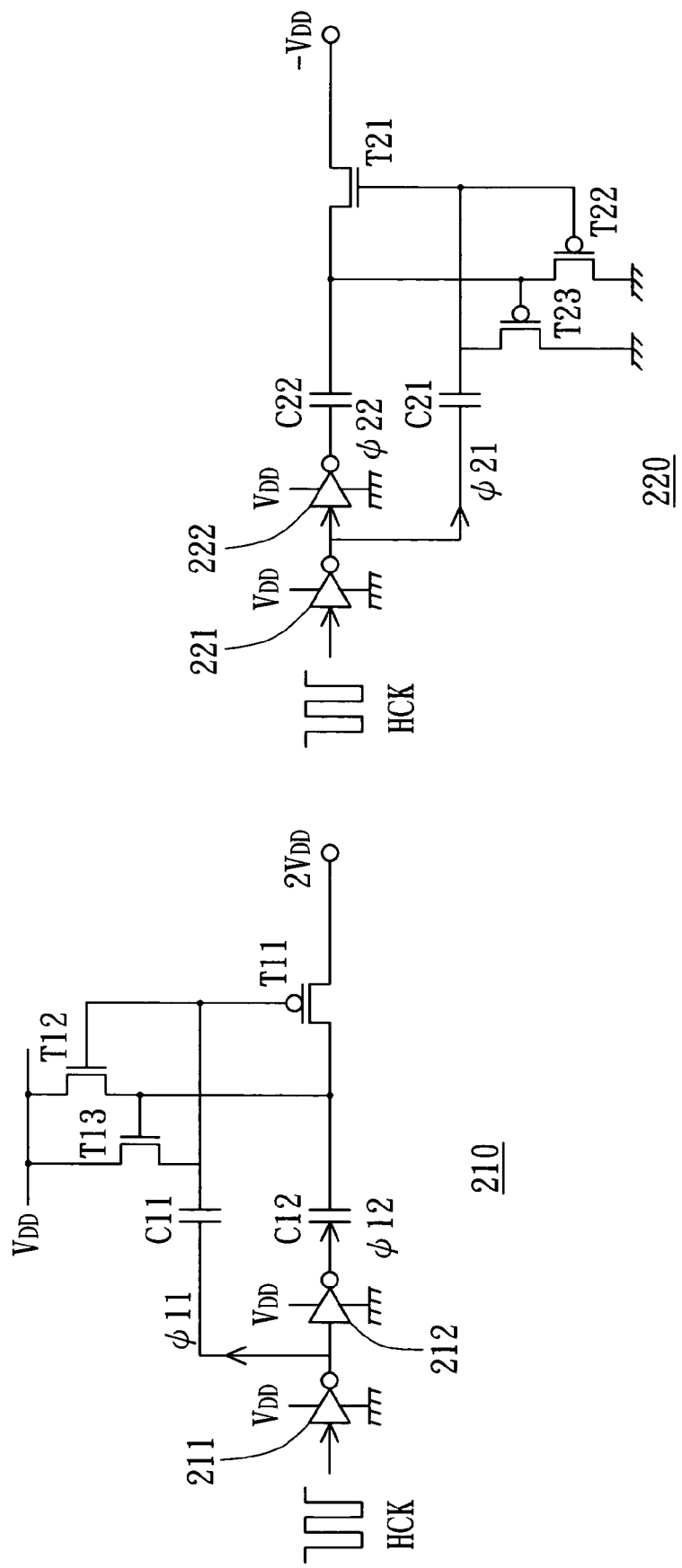
FIG. 2 (Prior Art) shows a circuit diagram illustrating a DC—DC converter as disclosed by U.S. Pat. No. 6,509,894
Figure 3A:
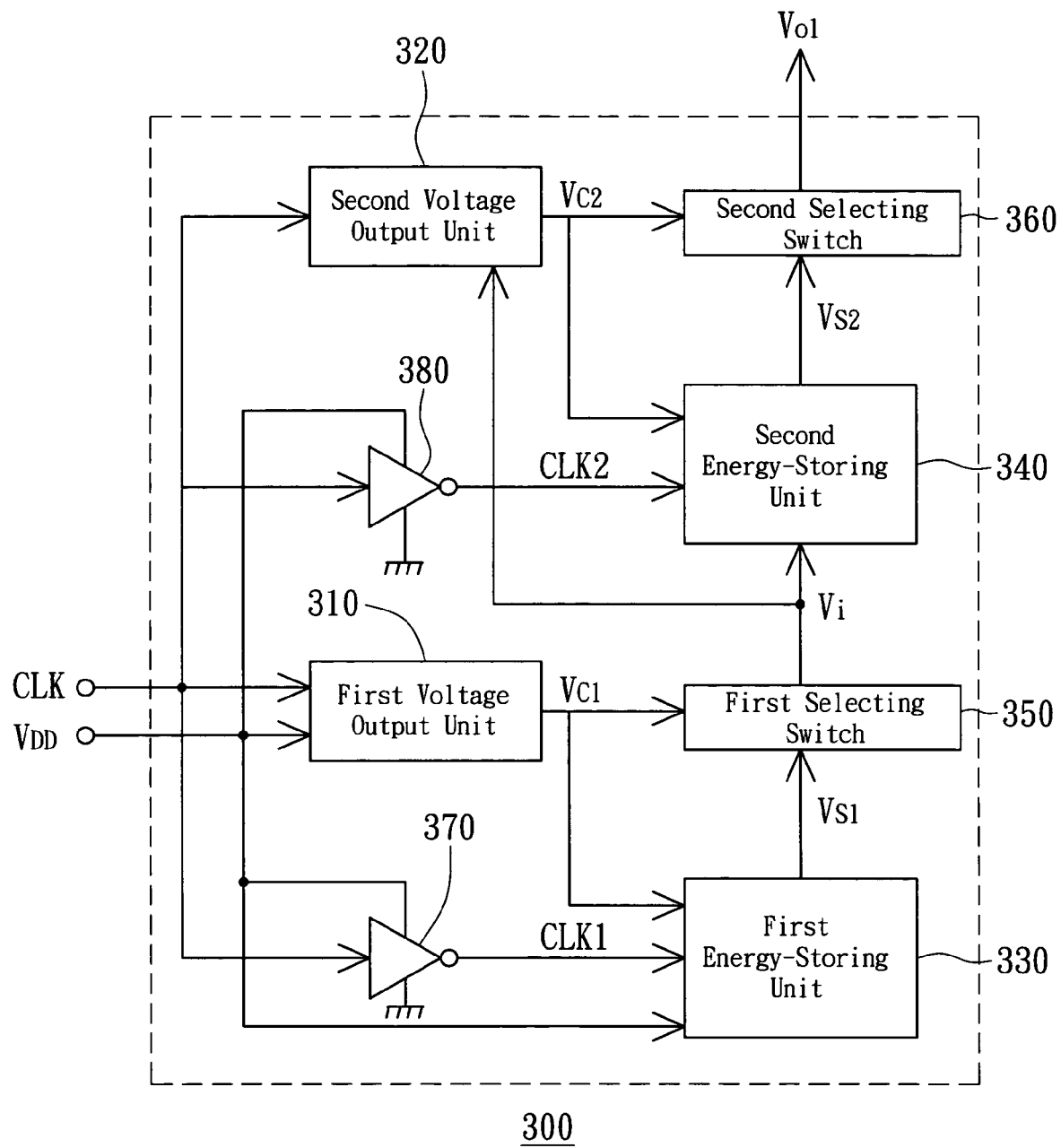
FIG. 3A is circuit diagram showing DC—DC converter outputting three times amplified output voltages according to first embodiment of the invention.

FIG. 3A shows a circuit diagram of a DC—DC converter outputting three times amplified voltages in accordance with the first embodiment of the present invention. DC—DC converter 300 includes first voltage output unit 310, second voltage output unit 320, first energy-storing unit 330, second energy-storing unit 340, first selecting switch 350, and second selecting switch 360. DC—DC converter 300 utilizes clock signal CLK of shift register (not shown in figure) and input voltage VDD, both located on display panel, (not shown in figure), to generate output voltage Vo1.

First voltage output unit 310 receives clock signal CLK and outputs control voltage Vc1. First energy-storing unit receives clock signal CLK1, and outputs energy-storing voltage Vs1. While controlled by control voltage Vc1, first selecting switch 350 outputs energy storing voltage Vs1 as output voltage Vi. Clock signal CLK1 is generated after clock signal CLK goes through inverter 370, where inverter 370 has a positive and a negative bias of VDD and 0V, respectively.

Second voltage output unit 320 receives clock signal CLK and outputs control voltage Vc2. The second energy-storing unit 340 receives clock signal CLK2 and outputs energy-storing voltage Vs2. The second selecting switch 360 outputs control voltage Vc2 as output voltage Vo1 according to energy-storing voltage Vs2. Clock signal CLK2 is generated after clock signal CLK2 goes through inverter 380, where positive and negative bias of inverter 380 are VDD and 0V, respectively.

Figure 3B:
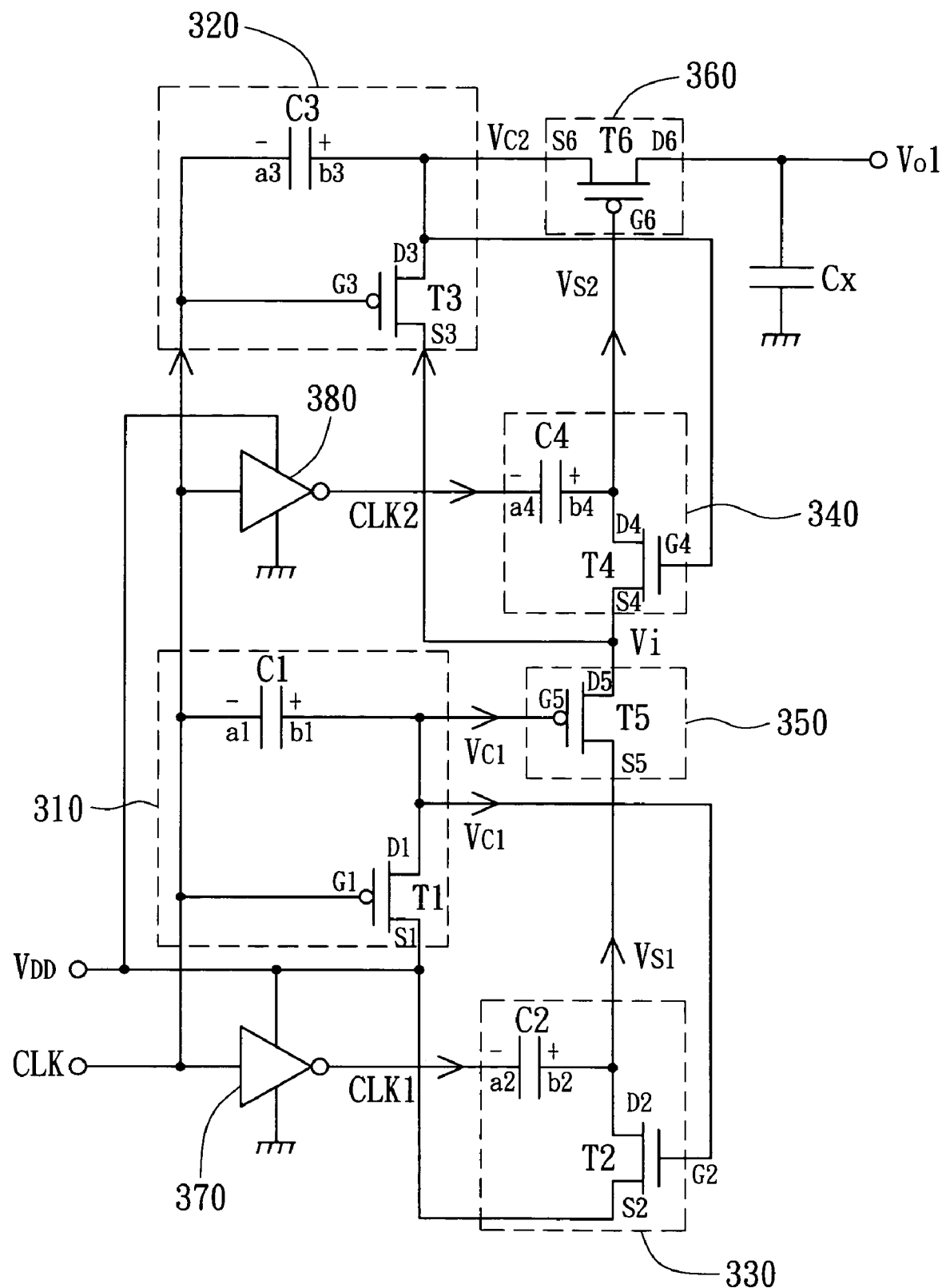
FIG. 3B is detailed circuit diagram showing DC—DC converter of FIG. 3A.

FIG. 3B shows a detailed circuit diagram of DC—DC converter 300 of FIG. 3A. First voltage output unit 310 includes capacitor C1 and PMOS (P-type Metal Oxide Semiconductor) transistor T1. Input voltage VDD is input to source S1 of transistor T1, clock signal CLK is input to gate G1 of transistor T1 and a1 end of capacitor C1. The b1 end of capacitor C1 is coupled to drain D1 of transistor T1 and outputs control voltage Vc1.

First energy-storing unit 330 includes capacitor C2 and NMOS (N-type Metal Oxide Semiconductor) transistor T2. Control voltage Vc1 is input to gate G2 of transistor T2, and input voltage VDD is input to source S2 of transistor T2. Clock signal CLK1 is input to a2 end of capacitor C2. The b2 end of capacitor C2 is coupled to drain of transistor T2 and outputs energy-storing voltage Vs1.

In addition, first selecting switch 350 includes a PMOS transistor T5 having a source S5, drain D5 and gate G5. Energy-storing voltage Vs1 is input to source S5, control voltage Vc1 is input to gate G5, and drain D5 outputs output voltage Vi.

Second voltage output unit 320 includes capacitor C3, and PMOS transistor T3 having source S3, drain D3, and gate G3. Output voltage Vi is input to source S3, clock signal CLK is input to gate G3, and b3 end of capacitor C3 is connected to drain D3. The b3 end of capacitor C3 outputs control voltage Vc2, and a3 end of capacitor C3 is controlled by clock signal CLK.

Second energy-storing unit 340 includes capacitor C4, and NMOS transistor T4 having source S4, gate G4, and drain D4. Control voltage Vc2 is input to gate G4, output voltage Vi is output to source S4. The a4 end of capacitor C4 receives clock signal CLK2, and b4 end of capacitor C4, connected to drain D4, outputs energy-storing voltage Vs2.

Second selecting switch includes PMOS transistor T6 having source S6, drain D6 and, gate G6. Energy-storing voltage Vs2 is input to gate G6, control voltage Vc2 is input to source S6, and drain D6 outputs voltage Vo1.

Figure 3C:
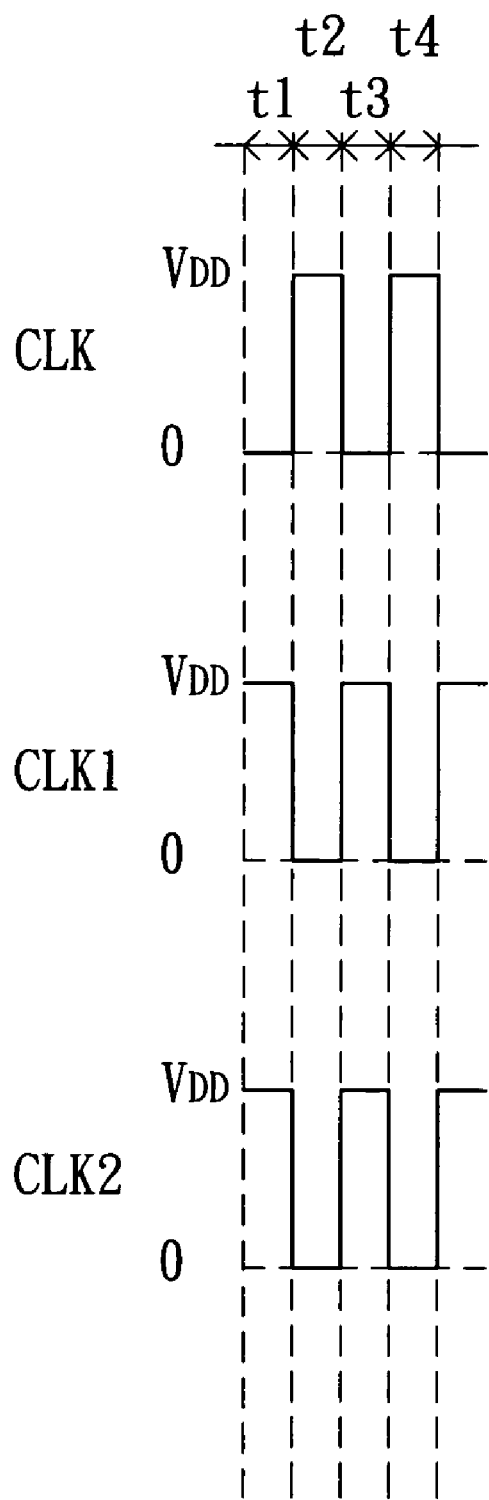
FIG. 3C is timing diagram showing clock signals CLK, CLK1 and CLK2 of FIG. 3B.

Referring to FIGS. 3B and 3C, at time t1, clock signal CLK is at 0V, and clock signals CLK1 and CLK2 are at VDD. At this time, the voltage of gate G1 of transistor T1 is 0V, which is lower than voltage VDD of source S1, thus causing transistor T1 to turn on. At this time, signal level of control voltage Vc1 is substantially the same as input voltage VDD, thus causing the voltage across capacitor C1 (which equals the voltage on b1 end minus the voltage on a1 end) to be VDD. At the same time, since gate G2 of transistor T2 has the voltage equal to control voltage Vc1 (=VDD), and the source S2 has voltage VDD, transistor T2 does not turn on.

Then, at time t2, clock signal CLK is at VDD, and clock signals CLK1 and CLK2 are at 0V. At this time, the voltage at a1 end of capacitor C1 becomes VDD, but since properties of capacitor govern that the voltage across capacitor C1 must remain at VDD in this condition, the voltage on b1 end rises from control voltage Vc1 to 2VDD.

In addition, since control voltage Vc1 is input to gate G2 of transistor T2, causing G2 voltage to become 2VDD, which is higher than voltage VDD of source S2. Thus, transistor T2 turns on, and causes the energy-storing voltage Vs1 to be substantially the same as input voltage VDD. And at this time, the voltage across capacitor C2 is VDD (equals to voltage on b2 end minus voltage on a2 end).

At time t3, clock signal CLK turns is at 0V, and clock signals CLK1 and CLK2 are at VDD. At this time, as described above, transistor T1 is turned on, and control voltage Vc1 is substantially the same as input voltage VDD, while transistor T2 is turned off. Since voltage across capacitor C2 must remain at VDD, the energy-storing voltage Vs1 raises to 2VDD. Since the voltage of gate G5 (=Vc1=VDD) is at a lower signal voltage than the voltage of source S5 (=Vs1=2VDD), transistor T5 is turned on, and thus the output voltage Vi is substantially the same as energy-storing voltage Vs1=(2VDD).

Also, at this time, transistor T3 turns on, and causes the voltage across C3 to be 2VDD (equals to voltage on b3 end minus voltage on a3 end), causes the signal level of control voltage Vc2 to be at 2VDD. Gate G4 of transistor T4 is also at control voltage Vc2 (=2VDD), and source S4 is at output voltage Vi (=2VDD), hence, transistor T4 does not turn on.

Next, at time t4, clock signal CLK is at VDD, and clock signals CLK1 and CLK2 are at 0V. At this time, gate G3 of transistor T3 has voltage VDD, which is at a lower bias of output voltage Vi (=2VDD)) than source S3, thus, T3 transistor turns on. However, since the voltage across capacitor C3 must remain at 2VDD, control voltage Vc2 becomes 3VDD. And output voltage Vi also increases to 2VDD. At the same time, voltage of gate G4 (which equals control voltage Vc2 (=3VDD)) of transistor T4 is higher than source voltage S4 (which equals output voltage Vi (~2VDD)), thus, transistor T4 turns on, following the rise of output voltage Vi to 2VDD, energy-storing voltage Vs2 also gradually increases accordingly. Although voltage of gate G6 (equals to energy-storing voltage Vs2) gradually increases, voltage of source S6 (equals to control voltage Vc2 (=3VDD)) is still at a higher voltage. Hence, transistor T6 will turn on, causing drain D6 of transistor T6 to output an output voltage Vo1 (=Vc2=3VDD).

Next, DC—DC converter 300 will repeat the conditions as described in time T3 and T4, causing transistor T6 to turn on and output an output voltage Vo1 equals to 3VDD. Drain D6 of transistor T6 can also be electrically connected to a voltage-stabilizing capacitor Cx in order to maintain the voltage of drain D6 of transistor T6 at 3VDD.

In addition, in the first embodiment, a1 end and a2 end capacitor C1 and capacitor C2 receive clock signals CLK and CLK1, respectively. However, providing that clock signals CLK and CLK1 transform to high signal level at a different time, such as two clock signals are not overlapping, then such modification is still within the scope of the appended claim. Similarly, providing that clocks signals CLK and CLK2 input to a3 and a4 end of capacitor C3 and C4 transform to high signal level at a different time, such as two clock signals are not overlapping, then such modification is still within the scope of the appended claim.

SECOND EMBODIMENT

Figure 4A:
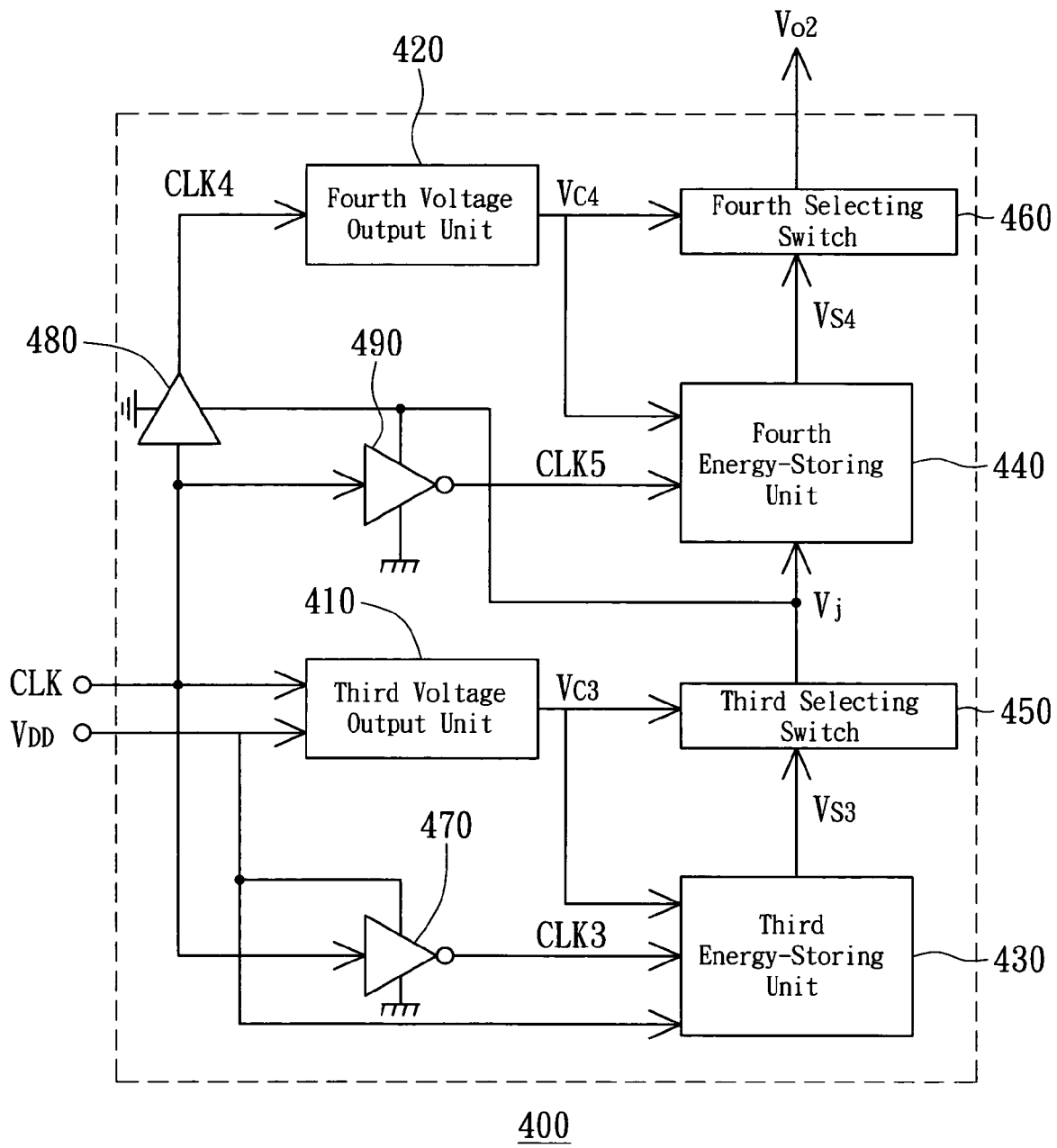
FIG. 4A is circuit diagram showing DC—DC converter outputting two times amplified and inverted output voltages according to second embodiment of the invention.

FIG. 4A shows a circuit diagram of a DC—DC converter outputting inverted and two times amplified output voltages in accordance with second embodiment of the present invention. DC—DC converter 400 includes third voltage output unit 410, fourth voltage output unit 420, third energy-storing unit 430, fourth energy-storing unit 440, third selecting switch 450 and fourth selecting switch 460. DC—DC converter 400 utilizes clock signal CLK of shift register (not shown in figure) and input voltage VDD, both located on display panel, (not shown in figure), to generate output voltage Vo2.

Third voltage output unit 410 receives clock signal CLK and outputs control voltage Vc3. Third energy-storing unit 430 receives clock signal CLK3, and outputs energy-storing voltage Vs3. Under control of control voltage Vc3, third selecting switch 450 outputs energy-storing voltage Vs3 as output voltage Vj, where clock signal CLK3 is generated after clock signal CLK goes through inverter 470, and positive and negative bias of inverter 470 are VDD and 0V, respectively. Besides, fourth voltage output unit 420 receives clock signal CLK4, and outputs control voltage Vc4, where control voltage Vc4 is generated after clock signal CLK goes through buffer 480.

Fourth energy-storing unit 440 receives clock signal CLK5 and output voltage Vj, and outputs energy-storing voltage Vs4. Fourth selecting switch 460, controlled by control voltage Vc4, selectively outputs energy-storing voltage Vs4 as output voltage Vo2, where clock signal CLK5 is generated after CLK goes through inverter 490, and both positive and negative bias of buffer 480 and inverter 490 are respectively Vj and 0V.

Figure 4B:
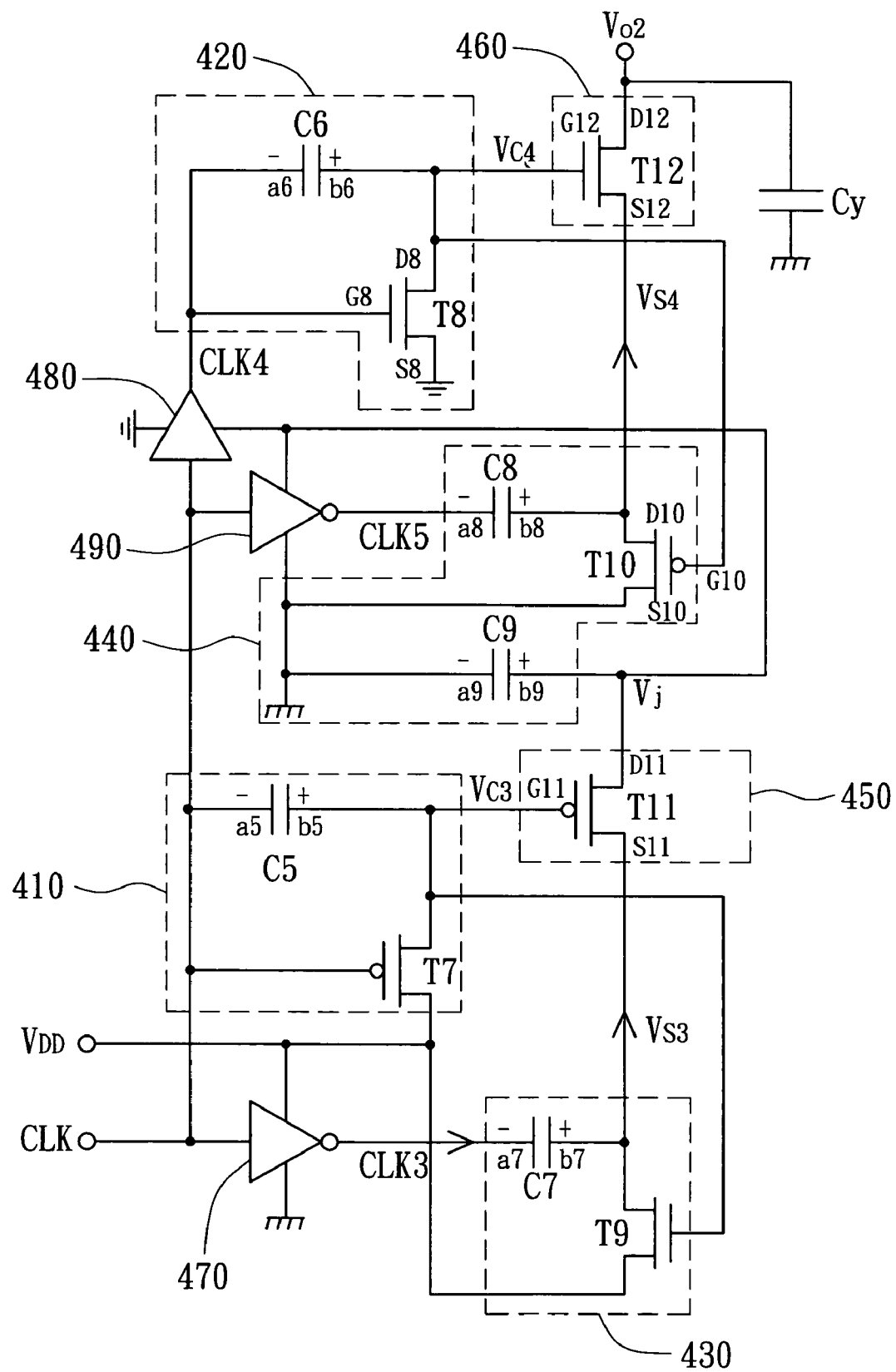
FIG. 4B is detailed circuit diagram of FIG. 4A.

FIG. 4B shows a detailed circuit diagram of DC—DC converter 400 of FIG. 4A. Third voltage output unit 410 includes capacitor C5 and PMOS transistor T7. Third energy-storing unit 430 includes capacitor C7 and NMOS transistor T9. Third selecting switch unit 450 includes PMOS transistor T11 having gate G11, source S11, and drain D11, where gate G11 is controlled by control voltage Vc3, source S11 receives energy-storing voltage Vs3, and drain D11 outputs output voltage Vj.

Fourth voltage output unit 420 includes capacitor C6, and NMOS transistor T8 having source S8, drain D8, and gate G8. Ground is connected to source S8, clock signal CLK4 is input to gate G8, and b6 end of capacitor C6 is connected to drain D8. The b6 end of capacitor also outputs control voltage Vc4, and a6 end of capacitor C6 receives clock signal CLK4.

Fourth energy-storing unit 440 includes capacitor C8, C9 and PMOS transistor T10. Control voltage Vc4 is input to gate G10 of transistor T10, source of transistor S10 is connected to ground. The a8 end of capacitor C8 receives clock signal CLK5, and b8 end of capacitor C8 couples to drain D10 of transistor T10, and drain D10 of transistor T10 outputs energy-storing voltage Vs4. The a9 end of capacitor C9 is grounded, and b9 end of capacitor C9 is coupled to drain D11 of transistor D11.

Fourth selecting switch 460 includes NMOS select transistor T12, having drain D12, source S12 and gate G12.

Energy-storing voltage Vs4 is input to source S12, control voltage Vc4 is input to gate G12, and drain D12 outputs output voltage Vo2.

Figure 4C:
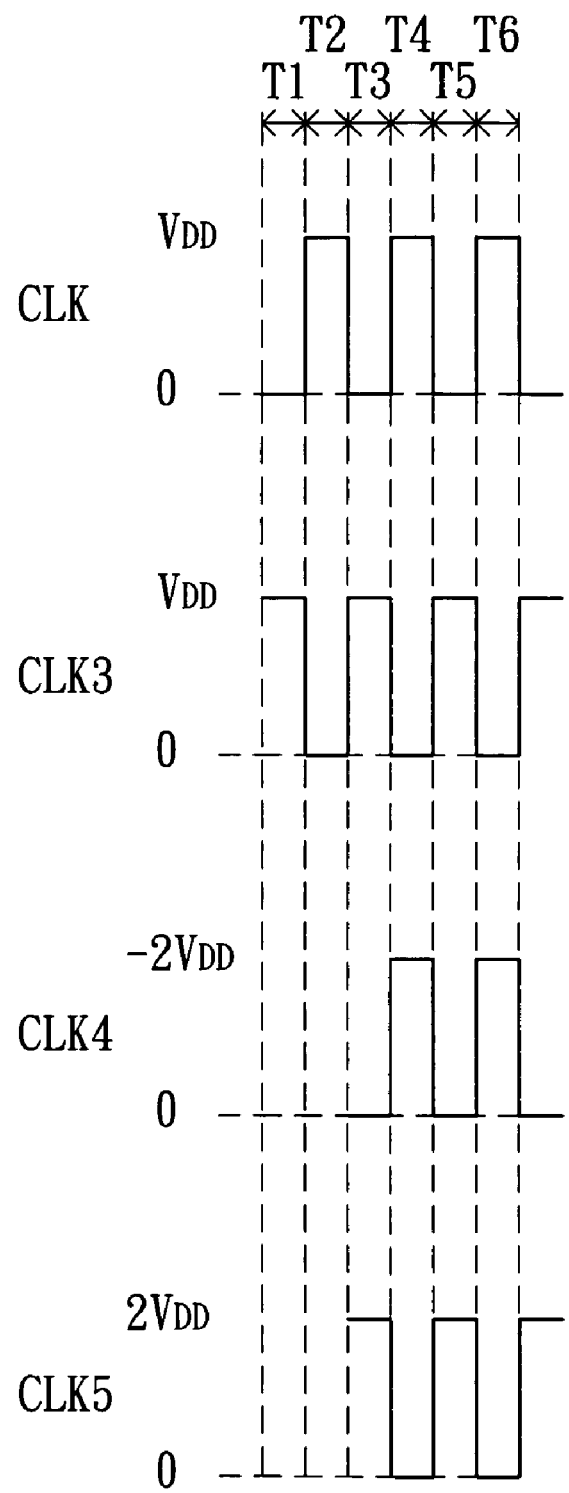
FIG. 4C is timing diagram of clock signals CLK, CLK3, CLK4 and CLK5 of FIG. 4B.

Referring to FIGS. 4B and 4C, at time T1, clock signal CLK is at 0V, and clock signal CLK3 is at VDD. At this time, transistor T7 turns on, causing control voltage Vc3 to be VDD, and voltage across capacitor C5 to be VDD.

Next, at time T2, clock signal CLK is at VDD, and clock signal CLK3 is at 0V. At this time, transistor T7 does not turn on, and control voltage Vc3 becomes 2VDD. Also, transistor T9 turns on, causing energy-storing voltage to be VDD, and voltage across capacitor C7 to be VDD.

At time T3, clock signal is at 0V, and clock signal CLK3 is at VDD. At this time, as described above, transistor T7 turns on, causing control voltage Vc3 to be VDD, but transistor T9 does not turn on. Since voltage across C7 must remain at VDD, energy-storing voltage Vs3 raises to 2VDD. And since transistor T11 is turned on, output voltage Vj becomes 2VDD, and the voltage across C9 becomes and remains at 2VDD.

Next, at time T4, clock signal CLK becomes VDD. Capacitor C9 causes output voltage Vj to remain at 2VDD. Clock signal CLK4 becomes 2VDD, and clock signal CLK5 becomes 0V. At this time, gate G8 of transistor T8 is at 2VDD, which is greater than 0V of source S8 of transistor T8. Hence, transistor T8 turns on, and causes control voltage Vc4 to be 0V, and voltage across C6 to be −2VDD (equals voltage on b6 end minus voltage on a6 end). In addition, voltage of gate G10 of transistor T10 is Vc4 (0V), and the voltage of drain D10 is 0V, thus, transistor T10 does not turn on.

At time T5, clock signal CLK and CLK4 become 0V, and clock signal CLK5 becomes 2VDD. At this time, transistor T8 does not turn on. Voltage across capacitor C6 is −2VDD, as a result, voltage on b6 end of capacitor C6 becomes −2VDD. Since gate voltage of transistor T10 is at control voltage Vc4(=−2VDD), which is lower than source voltage of 0V, transistor T10 turns on, and energy-storing voltage Vs4 becomes 0V. At the same time, clock signal being at 2VDD causes the voltage across capacitor C8 to be −2VDD (equals voltage on b8 end minus voltage on a8 end). However, since gate voltage of transistor T12 is at control voltage Vc4 (=−2VDD), which is lower than 0V (energy-storing voltage Vs4) of source voltage, the transistor still does not turn on.

At time T6, clock signal CLK becomes VDD, clock signal CLK4 becomes 2VDD, and clock signal CLK5 becomes 0V. At this time, transistor T8 turns on, control voltage Vc4 becomes 0V, transistor T10 does not turn on Since clock signal CLK5 is at 0V, and capacitor has a voltage of −2VDD across, energy-storing voltage Vs4 becomes −2VDD. Meanwhile, gate G12 of transistor T12 is at control voltage Vc4 (=0V), which is greater than the voltage of source S12 (equals energy-storing voltage Vs4=−2VDD). Thus, transistor T12 turns on, and causes output voltage Vo2 to become Vs4 (−2VDD). Next, DC—DC converter 400 will repeat conditions described during time T5 and T6, causing transistor T12 to output DC voltage of −2VDD when turned on. During time when transistor T12 is not turned on, voltage-stabilizing capacitor Cy, coupled to drain D12 of transistor T12, is used to maintain output voltage Vo2 at −2VDD.

The clock signals CLK3 and CLK5 as described above are generated after clock signal CLK goes through inverter 470 and 490, and clock signal CLK4 is generated after CLK signal goes through buffer 480. However, the invention can also use other clock signals, providing that clock signals CLK3 and CLK, and clock signals CLK4 and CLK5, are not the same clock signal, such as two non-overlapping clock signals and low signal level of signal CLK4 and CLK5 are the same as low signal level of CLK (such as 0V), and high signal level of signal CLK4 and CLK5 are twice the high signal level of CLK, an inverted and two times amplified output voltage Vo2 can be produced.

Even though DC—DC converter 300 and 400 under present invention are used to respectively output three times amplified, and two times amplified and inverted DC voltages, yet if only the combination of first voltage output unit 310, first energy-storing unit 330, and first selecting switch 350 or of third voltage output unit 410, third energy-storing unit 430 and third selecting switch 450, are used, input voltage VDD can still be converted to output voltage Vi or Vj, having twice the voltage of VDD.

Although the two embodiments described above use MOS transistors T1~T12 as exemplary illustration, providing that any form of selecting switch, such as TFT (Thin Film Transistor) or transmission gate, can be controlled by clock signals or control voltages as described in the two embodiments, then such variation is still within the scope of the appended claim.

Furthermore, clock signals CLK and CLK1 of DC—DC converter 300 or 400 of present invention are not limited to signal levels 0V and VDD, but can also be at other signal levels. When clock signals CLK and CLK1 are alternatively at a first signal level and a second signal level, voltage Vi and Vj are substantially the same as input voltage VDD, plus the difference in voltage between second and first signal level, wherein first signal level is lower than second signal level. And output voltage Vo2 is substantially the same as output voltage VDD, plus the negative difference in voltage between second and first signal level. When signal levels CLK2 and CLK3 are alternatively at a third signal level and a fourth signal level, output voltage Vo1 is substantially the same as the sum of output voltage VDD, difference in voltage between second and first signal level, and the difference in voltage between fourth and third signal level.

By utilizing drain D6 of transistor T6 and drain D12 of transistor T12 to respectively couple with voltage-stabilizing capacitor Cx and Cy, the DC—DC converter 300 and 400 of present invention, regardless of clock signal CLK being high or low, allows transistor T6 and T12 to output stable output voltage Vo1 and Vo2. However, DC—DC converter can utilize design of dual-direction structure, by means of using two DC—DC converters 300 or 400, electrically connecting output nodes of two DC—DC converters, and having clock signals CLK received by two DC—DC converters be the invert of each other, to allow two DC—DC converters to alternatively output all desired voltages.

According to the two embodiments described above, DC—DC converters under present invention have many advantages. Present invention utilizes existing input voltage VDD and clock signal CLK of shift register, not requiring additional level shifter to increase signal level of clock, and not requiring additional input voltage of different signal level, to output three times amplified, and two times amplified and inverted DC voltages, and results in the intended reduction in panel area, the ability to have low voltage input, and the decrease in power consumption.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A DC—DC converter for converting an input voltage into a first output voltage, comprising:
   a first voltage output unit, comprising:
   a first switch, having an input terminal for receiving the input voltage, an output terminal, and a gate; and
   a first capacitor, having a first terminal coupled to the gate of the first switch, and a second terminal coupled to the output terminal of the first switch;
   a first inverter, for receiving the input voltage and coupled to the first voltage output unit;
   a first energy-storing unit, comprising:
   a second switch, having an input terminal coupled to the input terminal of the first switch, a gate coupled to the output terminal of the first switch, and an output terminal; and
   a second capacitor, having a first terminal coupled to the first inverter, and a second terminal coupled to the output terminal of the second switch; and
   a first selecting switch, having an input terminal coupled to the first energy-storing unit, an output terminal for outputting the first output voltage, and a gate coupled to the first voltage output unit.

2. The DC—DC converter according to claim 1, farther outputting a second output voltage, farther comprising:
   a second voltage output unit, comprising:
      a third switch having an input terminal coupled to the output terminal of the first selecting switch, an output terminal, and a gate; and
      a third capacitor having a first terminal coupled to the first voltage output unit, and a second terminal coupled to the output terminal of the third switch;
   a second inverter coupled to the first voltage output unit and the first energy-storing unit, and for receiving the input voltage;
   a second energy-storing unit comprising:
      a fourth switch having an input terminal coupled to the first selecting switch, an output terminal and a gate; and
      a fourth capacitor having a first terminal coupled to the second inverter, and a second terminal coupled to the output terminal of the fourth switch; and
   a second selecting switch having an input terminal coupled to the second voltage output unit, an output terminal for outputting the second output voltage, and a gate coupled to the second energy-storing unit.

3. The DC—DC converter according to claim 1, further outputting a second output voltage, further comprising:
   a second voltage output unit comprising:
      a third switch having an input terminal, an output terminal and a gate of the third switch; and
      a third capacitor having a first terminal coupled to the fist voltage output unit, and a second terminal coupled to the output terminal of the third switch;
   a second inverter coupled to the first voltage output unit and the first energy-storing unit for receiving the input voltage;
   a buffer for receiving the input voltage, and coupled to the second inverter and the second voltage output unit;
   a second energy-storing unit comprising:
      a tenth switch having a gate coupled to the second voltage output unit, an input terminal, and an output terminal;
      a ninth capacitor having a first terminal coupled to the input terminal of the tenth switch, and a second terminal coupled to the output terminal of the first selecting switch; and
      an eighth capacitor having a first terminal coupled to the output terminal of the second inverter, and a second terminal coupled to the output terminal of the tenth switch; and
   a second selecting switch having an input terminal coupled to the second energy-storing unit, an output terminal for outputting the second output voltage, and a gate coupled to the second voltage output unit.

4. The DC—DC converter according to claim 1, wherein the first switch is a PMOS (P-type Metal Oxide Semiconductor) transistor, the second switch is an NMOS transistor, and the first selecting switch is a PMOS transistor.

5. The DC—DC converter according to claim 1, wherein the gate of the first switch is for receiving a clock signal.

6. The DC—DC converter according to claim 5, wherein the first terminal of the first capacitor is for receiving the clock signal and the second terminal of the first capacitor is for outputting a first control voltage.

7. The DC—DC converter according to claim 6, wherein the gate of the second switch is for receiving the first control voltage.

8. The DC—DC converter according to claim 5, wherein the first inverter is for transferring the clock signal to a first clock signal.

9. The DC—DC converter according to claim 8, wherein the first terminal of the second capacitor is for receiving the first clock signal, and the second terminal of the second capacitor is for outputting a first energy-storing voltage.

10. The DC—DC converter according to claim 9, wherein the input and output terminals of the first selecting switch are for receiving and outputting the first energy-storing voltage regarded as the first output voltage, and the gate of the first selecting switch is for receiving the first control voltage.

11. The DC—DC converter according to claim 6, wherein the clock signal is alternatively at a first level and a second level, wherein the first level is lower than the second level.

12. The DC—DC converter according to claim 11, wherein the first control voltage and the input voltage are the same when the clock signal is at the first level.

13. The DC—DC converter according to claim 11, wherein the first control voltage is substantially equal to the input voltage plus the difference in voltage between the first level and the second level.

14. The DC—DC converter according to claim 2, wherein the input and the output terminals of the third switch are for receiving and outputting the first output voltage respectively, and the gate of the third switch is for receiving a clock signal.

15. The DC—DC converter according to claim 14, wherein the first terminal of the third capacitor is for receiving the clock signal and the second terminal of the third capacitor is for outputting a second control voltage.

16. The DC—DC converter according to claim 15, wherein the second inverter is for transferring the clock signal to a second clock signal.

17. The DC—DC converter according to claim 16, wherein the input and output terminals of the fourth switch are for receiving and outputting the first input voltage, and the gate of the fourth switch is for receiving the second control voltage.

18. The DC—DC converter according to claim 16, wherein the first terminal of the fourth capacitor is for receiving the second clock signal and the second terminal of the fourth capacitor is for outputting a second energy-storing voltage.

19. The DC—DC converter according to claim 18, wherein the input and output terminals of the second selecting switch are for receiving and outputting the second control voltage, and the gate of the second selecting switch is for receiving the second energy-storing voltage.

20. A DC—DC converter for converting an input voltage into a first output voltage, comprising:
- a first voltage output unit, for receiving the input voltage, receiving a clock signal, and outputting a first control voltage;
- a first inverter, coupled to the first voltage output unit, for transferring the clock signal to a first clock signal;
- a first energy-storing unit, coupled to the first voltage output unit, for receiving the input voltage, receiving the first control voltage, receiving the first clock signal, and outputting a first energy-storing voltage; and
- a first selecting switch, coupled to the first energy-storing unit, for receiving the first energy-storing voltage, and outputting the first energy-storing voltage as the first output voltage according to the first control voltage.

21. The DC—DC converter according to claim 20, further outputting a second output voltage, further comprising:
- a second voltage output unit, coupled to the first voltage output unit, for receiving the first output voltage, receiving the clock signal, and outputting a second control voltage;
- a second inverter, coupled to the first voltage output unit and the first inverter, for receiving the input voltage and transferring the clock signal to a second clock signal;
- a second energy-storing unit, coupled to the second voltage output unit, the second inverter, and the first selecting switch, for receiving the first output voltage, receiving the second clock signal and outputting a second energy-storing voltage; and
- a second selecting switch, coupled to the second energy-storing unit and the second voltage output unit, for receiving the second control voltage, and receiving and outputting the second energy-storing voltage regard as the second output voltage.

22. The DC—DC converter according to claim 21 further comprising a buffer, coupled to the second inverter and the second voltage output unit, for receiving the input voltage.

\* \* \* \* \*